United States Patent
Fluhr et al.

(10) Patent No.: US 7,302,525 B2
(45) Date of Patent: Nov. 27, 2007

(54) METHOD AND APPARATUS FOR EFFICIENTLY ACCESSING BOTH ALIGNED AND UNALIGNED DATA FROM A MEMORY

(75) Inventors: Eric Jason Fluhr, Round Rock, TX (US); Sheldon B. Levenstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 11/055,828

(22) Filed: Feb. 11, 2005

(65) Prior Publication Data

US 2006/0184734 A1    Aug. 17, 2006

(51) Int. Cl.
*G06F 12/02* (2006.01)
(52) U.S. Cl. .................... 711/118; 711/201
(58) Field of Classification Search .......... None
See application file for complete search history.

(56) References Cited

U.S. PATENT DOCUMENTS 5,606,520 A * 2/1997 Gove et al. .............. 708/491
2002/0116567 A1 * 8/2002 Vondran, Jr. ............. 711/3

* cited by examiner

*Primary Examiner*—T Nguyen
(74) *Attorney, Agent, or Firm*—Duke W. Yee; Diana R. Gerhardt; Wayne P. Bailey

(57) ABSTRACT

A technique for improving access times when accessing memory, such as when accessing data from cache. By a unique manipulation and usage of a specified memory address in combination with the cache's internal organization, the address range required by the requested data can be covered by one odd and one even segment of the cache, where the odd segment is always at the base address created by the summation of the source operands and set to the odd segment, and the even address is created by summation of the source operands plus an offset value equivalent to the size of the cache line. This structural regularity is used to efficiently generate both the even and odd addresses in parallel to retrieve the desired data.

3 Claims, 3 Drawing Sheets

METHOD AND APPARATUS FOR EFFICIENTLY ACCESSING BOTH ALIGNED AND UNALIGNED DATA FROM A MEMORY

BACKGROUND OF THE INVENTION

1. Technical Field

The present invention is directed to techniques for efficiently accessing memory, and in particular to improved techniques for efficiently accessing both aligned and unaligned data from such memory. Still more particularly, the present invention provides address and cache organization that increases the efficiency of handling unaligned data, while minimizing the physical resources needed to support it.

2. Description of Related Art

In some computer architectures, memory operand length can be defined as eight (8) bytes or less. An operand is considered aligned if it falls on an address with the least significant bit equal to a single "0" bit for a half-word (i.e. 2 bytes), the two least significant bits equal to double "00" bits for a word (4 bytes), or the three least significant bits equal to triple "000" bits for a double word (8 bytes). An operand is considered unaligned if it violates the definition of alignment. If all operands are aligned in an architecture, then only 8 bytes (the size of the cache line in such an architecture) would be required from the memory subsystem. For systems that support unaligned data, more than 8 bytes are necessary as retrieval of a single cache line will not satisfy the request. Often, unaligned data requires additional logic or circuit resources to efficiently support it.

Memory structures, like caches, provide discrete quantities of data when accessed, such discrete quantities of data sometimes being referred to as a cache line or cache block. Often, the amount of data that is provided is dictated by physical design constraints such as silicon area or wireability. The smaller the amount of data retrieved, the faster the access time for that data. Similarly, the simpler the access mechanism, the faster the access time can be. So, while complex algorithms for data retrieval are possible, they often preclude high frequency access to such data.

It would thus be desirable to provide a technique of address and cache organization that increases the efficiency of handling unaligned data, while minimizing the physical resources (transistors, wires, etc.) needed to support it.

SUMMARY OF THE INVENTION

The present invention is directed to a technique for improving access times when accessing memory, such as when accessing data from cache. For aligned data, the specified base address can be directly used when accessing the cache as the retrieved cache line will fully contain the requested data. If a specified address is in an even segment of the cache, the data is not aligned and the length of the requested data extends beyond the current segment's boundary, then part of the data fetched from the next sequential odd segment which has the same base address is subsequently used. If a specified address is in an odd segment, the data is not aligned and the length of the requested data extends beyond the current segment's boundary, then part of the data fetched from the next sequential segment which has a base address equal to the odd segment plus an offset value equivalent to the size of the cache line is subsequently used. In all cases, the address range required by the requested data can be covered by one odd and one even segment, where the odd segment is at the base address created by the summation of the source operands and set to the odd segment, and the even segment is at the base address created by summation of the source operands plus an offset value equivalent to the size of the cache line. This structural regularity is used to efficiently generate both the even and odd segment addresses in parallel to retrieve the desired data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
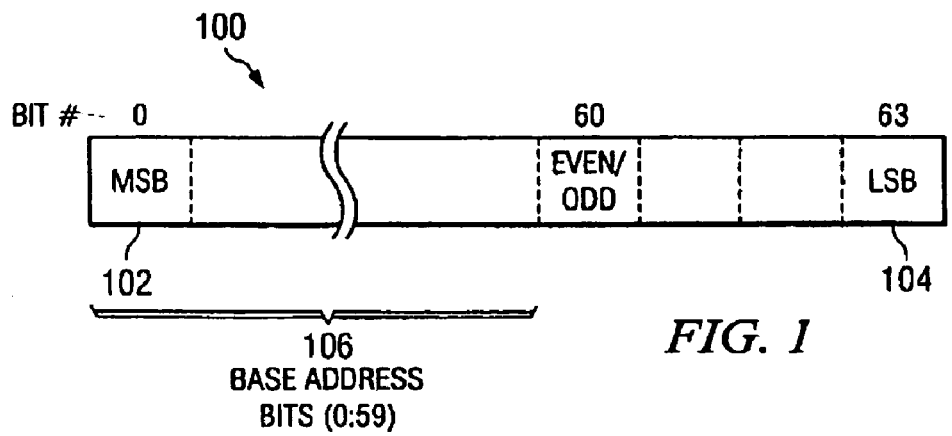
FIG. 1 depicts the organizational structure of a 64-bit field used for addressing a memory such as a cache.

The present invention is directed to a technique for improving access times when accessing memory, such as when accessing data from a data cache or instructions from an instruction cache. As used herein, the term 'data' is meant to cover any type of data such as instructions to be executed, or the more traditional data values used in conjunction with instruction execution. The preferred embodiment of the present invention uses 64 bits to address the memory, with bit 0 being the most significant bit and bit 63 being the least significant bit. The address space of the memory, in the preferred embodiment a cache memory, is logically and physically separated into even and odd segments based on bit number 60 of these segments, where when bit 60=0 it specifies an even segment of the cache memory is to be accessed and when bit 60=1 it specifies an odd segment of the cache memory is to be accessed. A specified memory address is determined by adding two source operands of an instruction together. The base address of such specified address is specified in bits 0 to 59 (also represented herein as bits 0:59), and naturally identifies locations within one of these even or odd segments. Various rules, as will now be described, are used to manipulate or otherwise determine addresses to be used when accessing these various segments of the cache memory, and to select associated data read from such segments, based upon the specified memory address.

If a specified memory address of data to be accessed is in an even segment (i.e. bit 60=0), the data is not aligned and the length of the requested data extends beyond the current segment's boundary, then part of the data fetched from the next sequential odd segment which has the same base address (bits 0:59) as the specified memory address, with bit 60 set=1 to specify the odd segment, is selected for use, as will be further exemplified below with respect to FIG. 3.

If a specified memory address of data to be accessed is in an odd segment (i.e. bit 60=1), the data is not aligned and the length of the requested data extends beyond the current segment's boundary, then part of the data fetched from the next sequential segment which has a base address plus 0x8 (i.e. base address+0x8) is selected for use, as will be further exemplified below with respect to FIG. 5.

If the desired data to be accessed is aligned, or the desired data is fully contained within the specified segment, then the segment location specified by the base address fully contains the data and the value of any computed second address for data fetching is extraneous, as will be further exemplified below with respect to FIG. 2.

In all cases, the address range required by the requested data can be covered by one odd and one even segment, where the odd segment is at the base address (bits 0:59) created by the summation of the two source operands (A+B) and augmented by bit 60 being set=1, and the even segment is at the base address created by summation of the two source operands (A+B) plus 0x8 (base address+0x8) and augmented by bit 60 being set=0.

This structural regularity is used to generate both the even and odd segment addresses in parallel. The L1 data cache is organized to hold data quantized to 8-byte amounts equivalent to the even and odd addresses. Each generated segment address retrieves 8 bytes from the L1 cache, resulting in 16 total bytes available. The necessary 8 or less bytes are then chosen from the available 16 bytes via a multiplexer.

Referring now to the figures and initially with respect to FIG. 1, there is shown at 100 the organization of a 64-bit address used to access data in memory. Bit # 0 is the most significant bit and is shown as msb at 102, and bit # 63 is the least significant bit and is shown as lsb at 104. The base address is specified using bits 0 through 59 (shown as bits (0:59)) at 106. Bit 60 specifies whether an even segment or an odd segment is being specified, with an even segment being specified when bit 60=0 and an odd segment being specified when bit 60=1.

Figure 2:
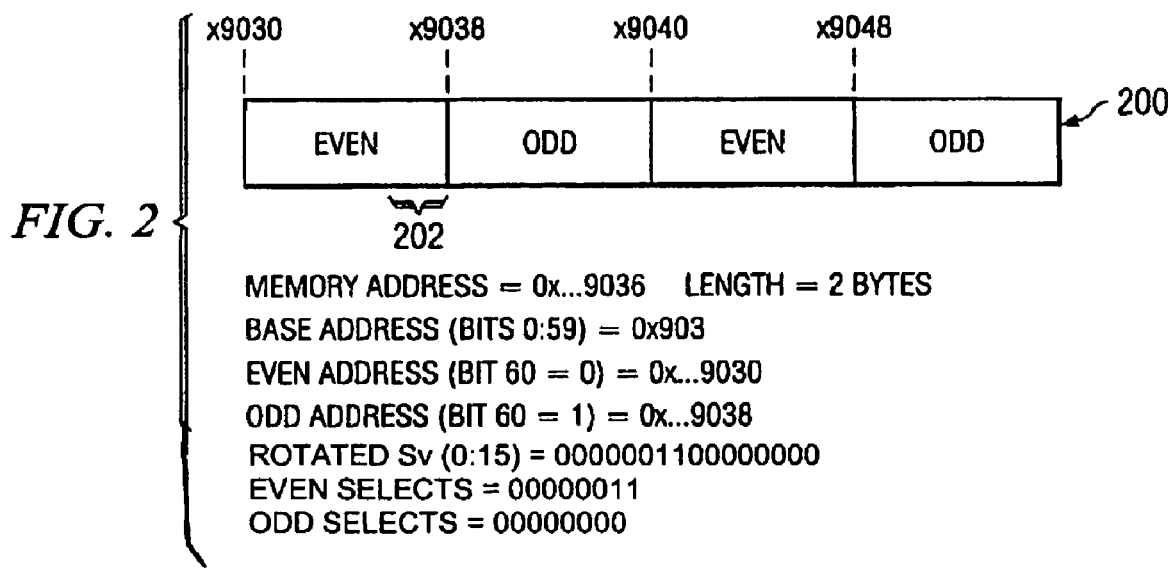
FIG. 2 depict an example of memory address manipulation based on the requested data's location in memory, where the specified address of the requested data is aligned.

Turning now to FIG. 2, there is shown an example of accessing a 2 byte data value at memory address 0x . . . 9036. The desired data 202 is shown to be located within the representative memory at 200, and in this example, the data is aligned since the desired operand is a 2 byte operand having its least significant single bit equal to a "0". In this situation, where the desired data is aligned, a base address of 0x903 is used (bits 0:59 of the memory address), with an even address of 0x . . . 9030 and an odd address of 0x . . . 9038. This is representative of a situation where the requested data is aligned, and therefore the segment to be accessed can be chosen by the base address since it fully contains the desired 2 bytes of data.

Figure 3:
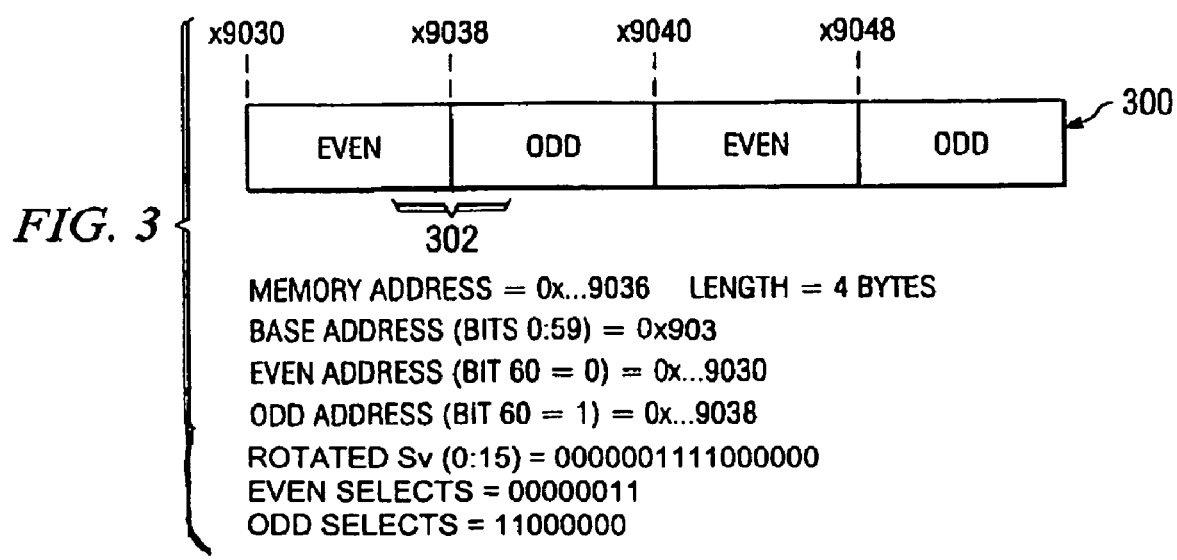
FIG. 3 depict an example of memory address manipulation based on the requested data's location in memory, where the specified address of the requested data is from an even segment, non-aligned, and extends beyond the current segment boundary.

Turning now to FIG. 3, there is shown an example of accessing a 4 byte data value at memory address 0x . . . 9036. The desired data 302 is shown to be located within the representative memory at 300, and in this example, the data is not aligned since the desired operand is a 4 byte operand having its two least significant bits not equal to a "00" (they are equal to "10"). In this situation, a base address of 0x903 is used, with an even address of 0x . . . 9030 and an odd address of 0x . . . 9038. This is representative of a situation where the requested data is from an even segment (bit 60=0), non-aligned, and not fully contained within the specified segment, and therefore part of the data should be fetched from the next sequential odd segment which has the same base address (bits 0:59) and bit 60 is set=1 (the odd segment).

Figure 4:
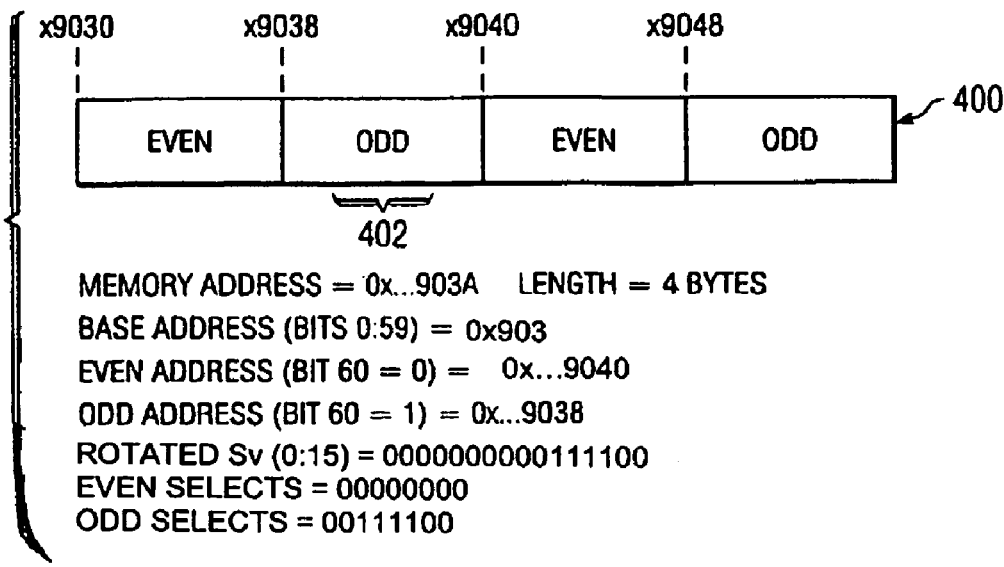
FIG. 4 depict an example of memory address manipulation based on the requested data's location in memory, where the specified address of the requested data is from an odd segment, non-aligned, and is contained within the current segment boundary.

Turning now to FIG. 4, there is shown an example of accessing a 4 byte data value at memory address 0x . . . 903A. The desired data 402 is shown to be located within the representative memory at 400, and in this example, the data is not aligned since the desired operand is a 4 byte operand having its two least significant bits not equal to a "00" (they are equal to "10"). In this situation, a base address of 0x903 is used, with an even address of 0x . . . 9040 and an odd address of 0x . . . 9038. This is representative of a situation where the requested data is from an odd segment (bit 60=1) and non-aligned. However, for this example, even though the 4 bytes are unaligned, the desired data is fully contained within the odd doubleword and therefore no data from the next sequential segment is needed. The even address calculation is the summation of the odd segment address (0x9038)+0x8=0x9042, and then clearing the last nibble (bits 60:63) yields 0x9040. This exemplifies that the unaligned data itself does not necessarily require access to the next sequential segment. Rather, the data has to be both unaligned and have a size larger than the bytes remaining within the starting segment in order to require access to the next sequential segment.

Figure 5:
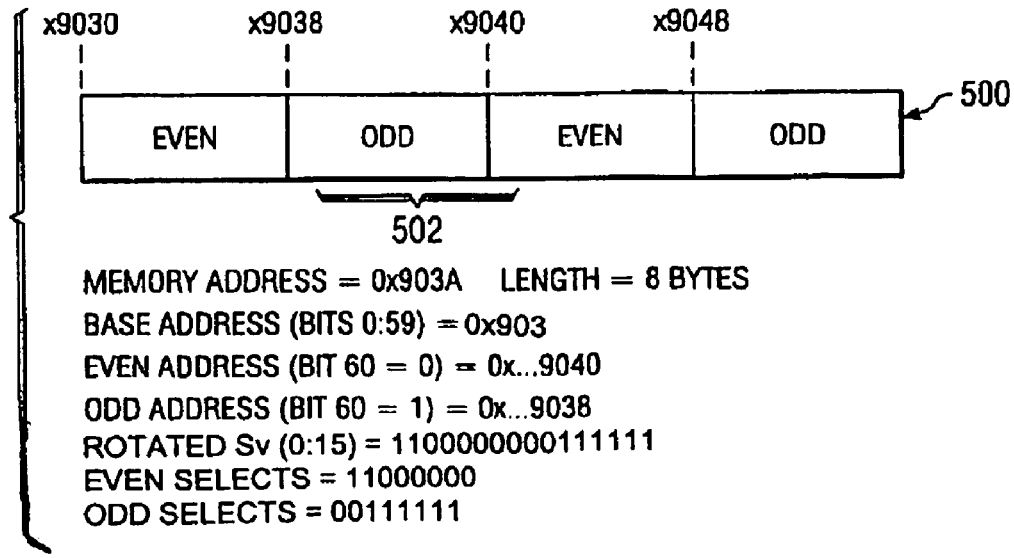
FIG. 5 depict an example of memory address manipulation based on the requested data's location in memory, where the specified address of the requested data is from an odd segment, non-aligned, and is contained within the current segment boundary.

Turning now to FIG. 5, there is shown an example of accessing an 8 byte data value at memory address 0x . . . 9038. The desired data 502 is shown to be located within the representative memory at 500, and in this example, the data is not aligned since the desired operand is an 8 byte operand having its three least significant bits not equal to a "000" (they are equal to "010"). In this situation, a base address of 0x903 is used, with an even address of 0x . . . 9040 and an odd address of 0x . . . 9038. This is representative of a situation where the requested data is from an odd segment (bit 60=1), non-aligned, and not fully contained within the specified segment, and therefore part of the data should be fetched from the next sequential segment which has a base address of the odd segment+0x8 (i.e. hexadecimal 8 is added to the base address of the odd segment). As can be seen, this results in fetching part of data from an even segment of the cache even when the specified memory address was to an odd segment, thereby providing that in all cases, the requested data can be covered by one odd and one even segment. This advantageously enables data to be concurrently fetched from two portions of cache in parallel, irrespective of the actual alignment of the requested data, and thus improving overall efficiency of data access.

Figure 6:
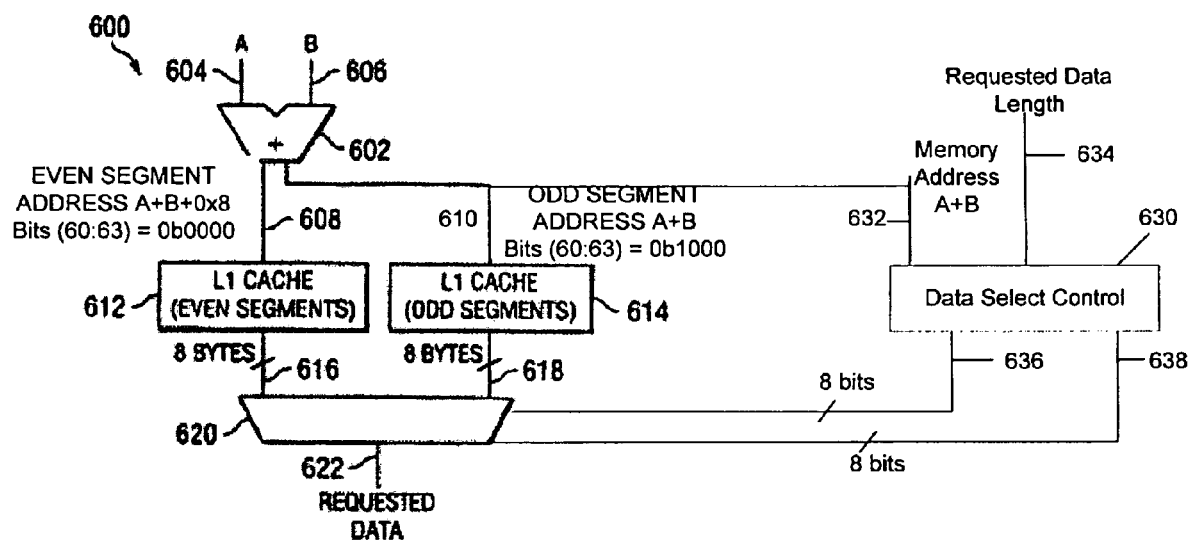
FIG. 6 depicts an address manipulation circuit that is used to access requested data from a cache memory, including concurrently accessing data from two portions of cache memory in parallel.

Turning now to FIG. 6, there is shown at 600 an address manipulation circuit that is used to access requested data from a cache memory such as an L1 cache. Adder 602 receives at inputs 604 and 606 source operands A and B, respectively. Source operands A and B, typically operands specified as a part of an instruction being executed, are used in determining the base address that is to be used when accessing/addressing memory. One example of such a source operand (such as source operand A) would be a value maintained in a base index register, and another example of such a source operand (such as source operand B) would be an immediate offset value. Adder 602 has two outputs shown at 608 and 610. Output 608 generates an address for addressing even segments of the L1 cache, such even segments being shown at 612. Output 610 generates an address for addressing odd segments of the L1 cache, such odd segments being shown at 614. The even segment cache address generated by adder 602 and output on output 608 is equal to operand address A+operand address B+0x8 (i.e. hexadecimal 8 is added to sum of addresses A and B, the sum of addresses A+B also being called the memory address of the desired data), as previously described with respect to non-aligned odd segments where the requested data extends beyond the current segment. The odd segment cache address generated by adder 602 and output on output 610 is equal to operand address A+operand address B (i.e. the sum of addresses A and B, also known as the memory address of the desired data), as previously described with respect to non-aligned even segment. The even address output at 608 is input to the even segment L1 cache 612, resulting in 8 bytes being output from such even segment cache at 616. Similarly, the address output at 610 is input to the odd segment L1 cache 614, resulting in 8 bytes being output from such odd segment cache at 618. Thus, a total of 16 bytes are output from the conglomerate L1 cache (including both the even segment and odd segment portions), and these 16 bytes are fed into multiplexer 622, where the desired requested data can then be extracted from the 16 byte input using a multiplexer control technique, as will now be described.

Multiplexer 620 is controlled by data select control circuit 630, which has two inputs—memory address (A+B) 632 and the requested data length 634. The data select control circuit 630 generates two sets of 8 bits that are coupled to control inputs of the multiplexer 620 (these two sets of 8 bits can also be considered as a single 16 bit value, but are depicted herein as two sets to logically show the even and odd segment selection). Output 636 is an 8-bit value used to select certain of the 8 bytes that were output from the even segment portion of the cache, and output 638 is an 8-bit value used to select certain of the 8 bytes that were output from the odd segment portion of the cache. A sixteen-bit vector Sv (0:15) is maintained internal to the data select control circuit 630, and the original bit values within this vector are dependent on the value of requested data length 634. There are four possible initial values for this vector, depending upon whether the requested data length is a byte, half-word, word or double-word. The initial values for this vector Sv (0:15) are shown below:

| REQUESTED DATA LENGTH | INITIAL VALUE OF VECTOR |
|---|---|
| Byte: | Sv (0:15) = 0b1000000000000000 |
| Half-word: | Sv (0:15) = 0b1100000000000000 |
| Word: | Sv (0:15) = 0b1111000000000000 |
| Double-word: | Sv (0:15) = 0b1111111100000000 |

This Sv (0:15) vector is then rotated right by the amount specified by bits (60:63) of the memory address A+B. For example, if bits (60:63)=0b0110, we rotate the vector 6 places. If bits (60:63)=0b1010, we rotate the vector 10 places. In all cases, since this is a rotate operation, data going out of bit 15 is input back into bit 0. The bits within this vector are then used to control multiplexor 620. The first eight bits of the vector, Sv (0:7) (shown as output 636), are used to select bytes that were output from the even segment portion of the cache memory. Similarly, the last eight bits of the vector, Sv (8:15) (shown as output 638), are used to select bytes that were output from the odd segment portion of the cache memory. In the preferred embodiment, a bit being a logical one ('1') means that a corresponding byte should be output at 622 as a part of the requested data. Thus, if the requested data length is a byte, there is 1 bit initially set to a logical one ('1') as shown above with the initial Sv (0:15) settings, and one byte will be output at requested data 622. The particular byte that is output will depend upon the bit rotation within Sv (0:15) based upon address bits (60:63) as described above. Similarly, if the requested data length is a half-word, there are 2 bits initially set to a logical one ('1') as shown above with the initial Sv (0:15) settings, and two bytes will be output at requested data 622. The particular bytes that are output will depend upon the bit rotation within Sv (0:15) based upon address bits (60:63) as described above. Similarly, if the requested data length is a word, there are 4 bits initially set to a logical one ('1') as shown above with the initial Sv (0:15) settings, and four bytes will be output at requested data 622. The particular bytes that are output will depend upon the bit rotation within Sv (0:15) based upon address bits (60:63) as described above. Finally, if the requested data length is a double-word, there are 8 bits initially set to a logical one ('1') as shown above with the initial Sv (0:15) settings, and eight bytes will be output at requested data 622. The particular bytes that are output will depend upon the bit rotation within Sv (0:15) based upon address bits (60:63) as described above. The rotated Sv (0:15) vector and resulting even select bits 636 and odd select bits 638 are also included in the various examples depicted in FIGS. 2-5.

Thus, it has been shown how the present invention improves access to a memory such as a cache memory by providing a structural regularity that is used to efficiently generate both the even and odd addresses in parallel to efficiently retrieve the desired data.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for accessing data from a memory, comprising:
    a first circuit comprising (i) a first input for receiving a first operand, (ii) a second input for receiving a second operand, (iii) a first output for outputting a summation of the first operand and the second operand, and (iv) a second output for outputting a summation of the first operand, the second operand and an offset value; and
    a cache memory comprising a first segment portion having an input and output, and a second segment portion having an input and output, wherein the input of the first segment portion is coupled to the first output of the first circuit, and wherein the input of the second segment portion is coupled to the second output of the first circuit.

2. The system of claim 1, wherein the first segment portion is associated with odd segment addresses of the cache memory and the second segment portion is associated with even segment addresses of the cache memory.

3. The system of claim 1, wherein the offset value is equal to a physical line size of the cache memory.

* * * * *